United States Patent [19]

Henning et al.

[11] 4,428,319

[45] Jan. 31, 1984

[54] SOCK SKIMMER DEPLOYMENT

[75] Inventors: Dean L. Henning, Needville; Lewis M. Clark, III, Houston; John M. Ward, Katy, all of Tex.

[73] Assignee: Shell Oil Company, Houston, Tex.

[21] Appl. No.: 32,043

[22] Filed: Apr. 23, 1979

[51] Int. Cl.³ .................. B63B 21/00; B63B 27/14; B01D 43/00
[52] U.S. Cl. .................. 114/253; 210/923; 210/242.3; 414/138
[58] Field of Search ............ 414/137, 138, 140, 143, 414/598, 599; 114/258, 259, 244, 245, 253, 365, 375; 405/66, 67; 187/6; 43/8; 14/71.1; 210/242.3, 776, 923, 800, 801

[56] References Cited

U.S. PATENT DOCUMENTS

| 3,523,611 | 8/1970 | Fitzgerald | 210/242 S |
| 3,548,605 | 12/1970 | Paull et al. | 210/DIG. 25 |
| 3,974,923 | 8/1976 | Mark et al. | 414/140 |

FOREIGN PATENT DOCUMENTS

| 853060 | 11/1960 | United Kingdom | 9/30 |
| 1031952 | 6/1966 | United Kingdom | 43/8 |

*Primary Examiner*—Sherman Basinger

[57] ABSTRACT

Apparatus for removing oil from the surface of a body of water including, an at least partially flexible, elongated chamber having an open, at least partially submerged front for receiving water and oil thereinto during relative movement between the chamber and the body of water; at least one cable for folding the chamber, the cable being slidably connected to at least one extremity of the chamber and fixedly connected to the other extremity of the chamber; and at least two inclinable ramps for launching and retrieving the chamber with a vessel of opportunity.

9 Claims, 19 Drawing Figures

FIG. 1

(PRIOR ART)

FIG. 1A

PRESENT INVENTION

SOCK SKIMMER DEPLOYMENT

BACKGROUND OF THE INVENTION

Oil which is spilled on water has been called the most expensive oil in the world. The cost of removing such oil is not only becoming ever more expensive, but the expenses of repairing damage to shorelines, boats and wildlife is likewise considerable. One major piece of equipment contributing to these increased costs is the skimmer employed for removing oil from water. There has been a trend toward building more sophisticated special purpose skimmers for use in coastal waters. These are specially built boats fitted with oil removal devices. Their construction is such that they are not usually suitable for other work and many of them must be maintained year round in port. As the search for oil has moved into deeper and more treacherous waters, these vessels have become much larger to accommodate the higher sea states, and consequently, much more costly. Much of this cost is for the vessel itself rather than for the actual oil recovery equipment. The high initial cost of the special purpose skimmer and cost of maintaining it, of course, limit the number of these units available. Thus, there is a need in the art to provide a more cost effective approach to oil spill recovery. It is desirable to develop portable skimming devices that fit on vessels of convenience, work boats, supply boats, fishing vessels, etc., which lessen the need for specially constructed vessels and significantly increase the amount of available spill recovery equipment reasonably close to the spill location.

SUMMARY OF THE INVENTION

The present invention in response to the above noted need provides an oil spill cleanup kit that can convert many kinds of vessels into temporary skimmers in a relatively short time. It permits more rapid response to oil spills which occur in remote areas. Such kits are storable on drilling platforms, for example, and if a spill occurs in the vicinity, work boats may be transformed into skimmers that immediately begin cleaning up the spill.

In general, each skimming kit has six components. The first component is the "sock" or actual oil skimming device. Generally, this is a one-piece fabrication of rubber or other flexible material which employs a wave-damping section, an oil collection section and multiple integral suction ports for picking up oil. Second, there is a floating frame such as an aluminum frame which supports the forward end of the sock maintaining it open and positioning it at the water's surface. The frame also provides a rigid structure for attaching a tow line while allowing the sock to roll and heave independently of the towing vessel. Third, a hydraulic crane is mounted at one end of each kit to facilitate assembly and deployment of the skimmer. Fourth, a pump and power unit is provided for hydraulic power to the crane and to a skimming suction pump. Fifth, a container is provided for storage for all components. It has the standard dimensions and fittings of a typical cargo container so that it can be trucked or shipped easily. The crank is mounted at one end of the container and the pump and power package at the other. The sock, frame, towable bags, hoses and tools are stored in the centerhold of the container. After these components are removed and deployed, baffles fold out from the container walls, and the centerhold becomes a oil/water separator. Sixth, towable bags are provided in the event of a large spill, so that oil drawn from the top of the oil/water separator is piped to the towable bags for temporary storage.

The first component, the skimming device (sock) above generally described, is towable alongside a vessel by tow means connected to the vessel substantially forward of the skimmer, whereby the motion of the skimmer is effectively uncoupled from the motion of the vessel. Means are provided for self-floating an open front of the sock so that it freely follows surface water motion. A chamber is formed within the sock for receiving oil and water thereinto by (first) the open self-floated front having an upwardly extending lip to prevent wave splashover; (second) a substantially flat, flexible, yet possessing some stiffness, wave-comformable top which contacts the oil, suppresses turbulence associated with wave chop inside the chamber, and prevents occurrence of an air interface between the chamber and the oil; (third) an at least semi-rigid, substantially flat bottom which is only at the forward end of the sock, but of substantial length to act in conjunction with the top, assisted with ties between the top and bottom, to arrest orbital water motion of intercepted waves while not impeding water and oil flow into the chamber; (fourth) sides connecting the top and the bottom which extend rearwardly at least at no greater angle than would substantially constrict water and oil flow within the chamber and preferably parallel or near parallel in the forward section of the skimmer; (fifth) an array of ties which connect the bottom to the top and (a) prevent the top from billowing upward to permit an air interface between the top and the oil, (b) prevent the bottom from billowing downward, increasing the drag forces, (c) and give some stiffness to the top to suppress turbulence; and (sixth) a rear extending downwardly from the top and spaced a substantial distance behind the bottom in order to downwardly direct water exiting from the chamber, whereby the change of current direction in combination with turbulence suppression by the top and arresting of orbital water motion by the forward bottom create an open bottomed quiescent oil capture zone within the chamber allowing oil to collect at the top of the chamber for removal therefrom. Means are also provided for removing the oil from the chamber by well point suction, whereby substantially water-free oil is withdrawn therefrom.

In a separate embodiment of the present invention, means is provided for folding or deploying this or similar skimmers principally characterized by an at least partially flexible, elongated chamber having an open, at least partially submerged front for receiving water and oil thereinto during relative movement between the chamber and the body of water. In particular, the folding or deploying means is at least one cable which is slidable connected to at least one extremity of the chamber and fixedly connected to the other extremity of the chamber. One or more slidable connections intermediate the connections at the extremities of the chamber, facilitate folding the chamber "accordian-style".

In yet another separate embodiment of the present invention, means is provided for launching and/or retrieving this or similar skimmers principally characterized by an at least partially flexible, elongated chamber having an open, at least partially submerged front for receiving water and oil thereinto during relative movement between the chamber and the body of water; and at least two inclinable ramps for launching and retrieving the chamber with a vessel. Preferably, each of the two inclinable ramps is composed of at least two segments united by a joint, one of the segments being in an elevated position to "cradle" the skimmer when the skimmer is being transported and in a lowered position when the skimmer is being launched or retrieved.

Of pertinence to the present invention are U.S. Pat. Nos. 3,886,750 and 3,996,614 as well as patents cited hereinafter.

DESCRIPTION OF PREFERRED EMBODIMENT

Figure 1:
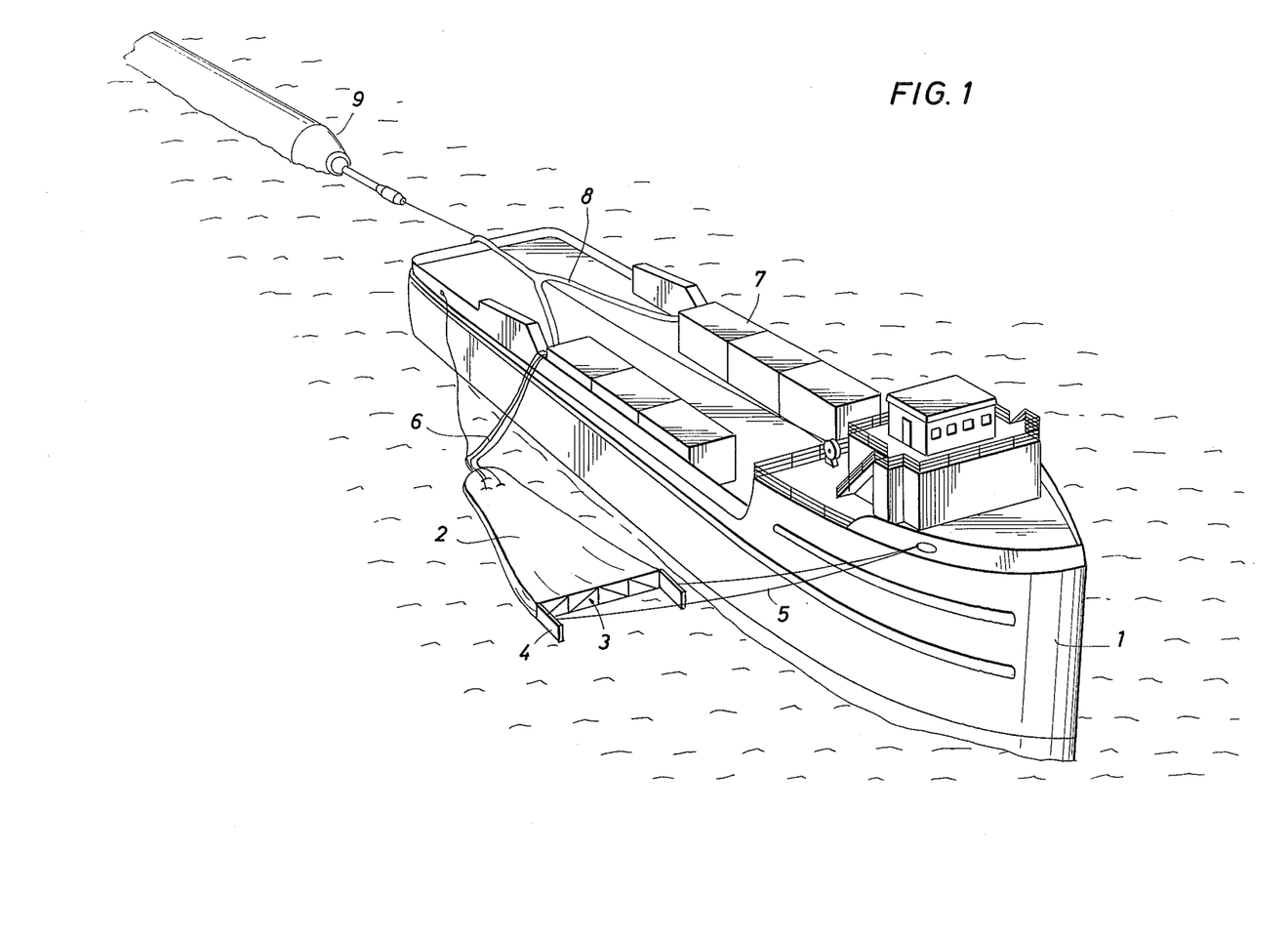
FIG. 1 is a view of a skimmer and towing vessel in operation.
Figure 1A:
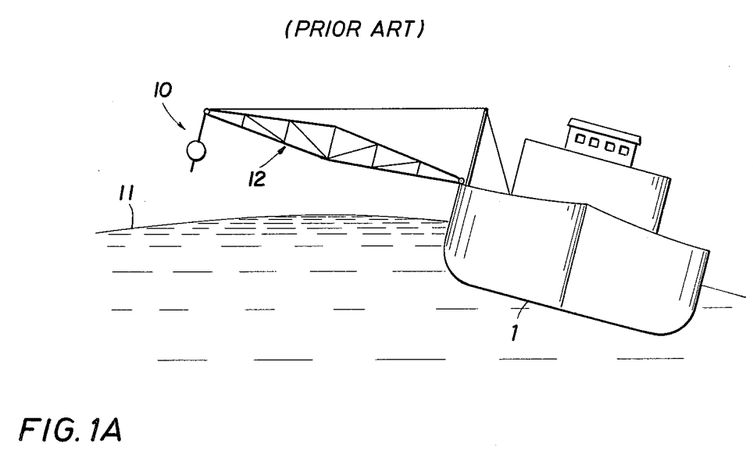
FIG. 1A shows a comparison of the prior art with the present invention.
Figure 1B:
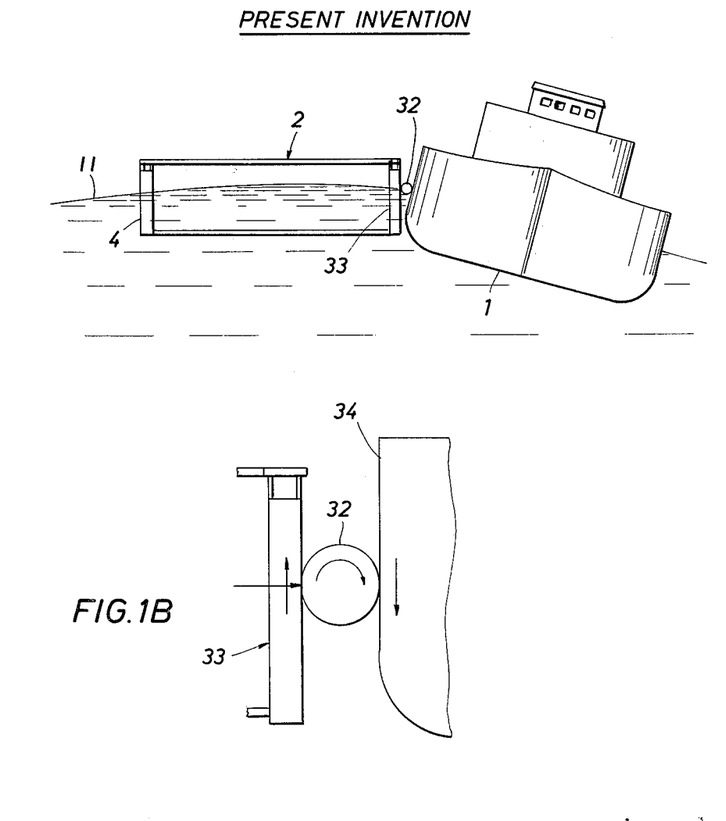
FIG. 1B is a view of the rotatable bumper of the present invention.

FIG. 1 provides an overall view of the present invention in use with a conventional work boat 1. Skimmer 2 which has the appearance of a flattened sock with an open front end is maintained open by floating frame 3 and with floats 4. The frame is attached to the work boat by lines 5 which connect with the boat well ahead of the position alongside the boat where the skimmer is deployed. With the lines placed forward and with a special bumper (described hereafter) the motion of the skimmer is effectively uncoupled from the motion of the boat, thereby allowing the skimmer to move freely up and down, pitch, roll, etc. In the prior art where a skimmer or boom is deployed alongside a vessel by a rigid connection, the motion of the vessel is translated into the skimmer or boom, causing it to dip beneath the water or raise above the water and in either case permitting oil to pass thereby, thus hindering effective removal of the oil from the water. U.S. Pat. No. 3,983,034 exemplifies the prior art in its employment of cable supported outrigger 68 which causes outboard boom 66 to dip in and out of the water with the roll of the vessel. FIG. 1A shows how the self-floated skimmer of the present invention remains uncoupled from the roll motion of the vessel 1 while the skimmer of the prior art permits the oil boom 10 (supported by outrigger 12) to raise out of the water 11 (or sink into the water if the roll were reversed) thereby causing oil to escape. A bumper 32 is deployable between the inboard float 33 of the skimmer of the present invention and the vessel 1 to prevent damage to the vessel by the skimmer. Note how the rotatable bumper 32 acts as a hinge to uncouple the motions. FIG. 1B shows how the rotatable bumper 32 permits the float 33 to raise up and maintain the desired water level even though the vessel side 34 is falling. This ability to translate (float and vessel) is important in preventing oil loss between the skimmer and the vessel. Clearly, impact damage to the skimmer or the vessel is also prevented by such a bumper.

Oil lines 6 from the rear part of the skimmer pass oil into the container 7 which is employed both as a device for separating oil and water from the skimmer, as more particularly described hereinafter, and also as a container for the skimmer and power components used to deploy the skimmer. Oil lines 8 extend from container 7 to a bag 9 towable behind the work boat 1 as a convenient means for storing separated oil, especially in the instance of larger spills which require extra storage space.

Figure 2:
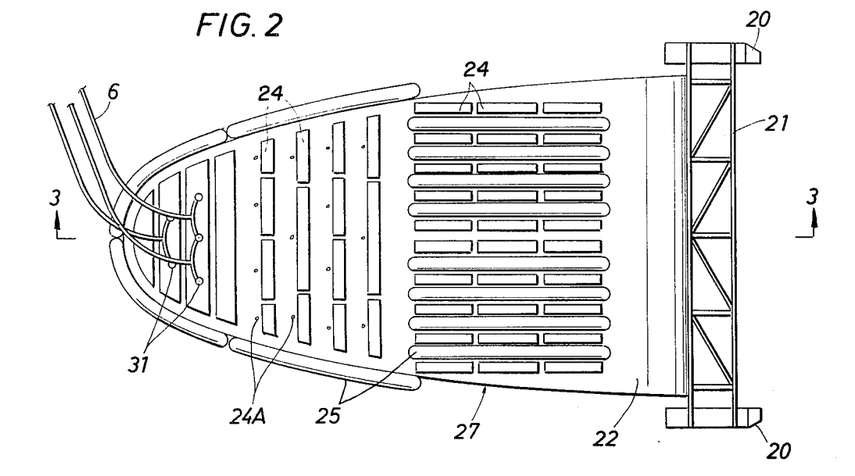
FIGS. 2 and 3 are top and sectional views, respectively, of the skimmer.
Figure 3:
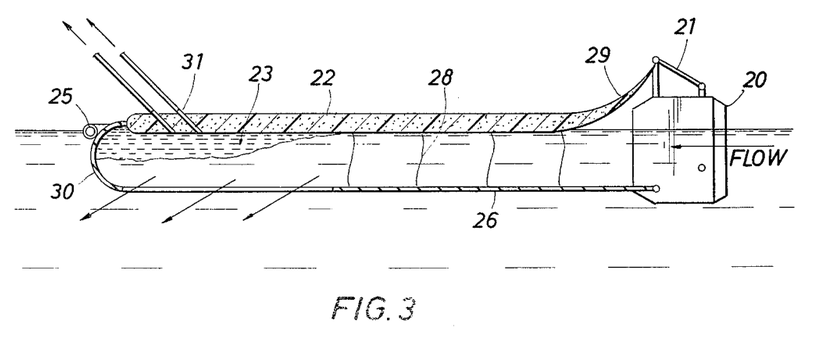

Referring now to FIGS. 2 and 3 of the drawings, a more detailed view of the skimmer is shown. The skimmer includes floats 20 which are mounted on opposite sides of a frame 21 which holds the front of the skimmer open and in a position to receive incoming oil and water. The top of the skimmer 22 is of a flexible material such as nitrile rubber or rubberized fabric which flexes easily with incoming waves and entrapped air. Air exhaust ports 24a expel air captured by the sock and prevent the occurrence of any air space between the top of the skimmer 22 and collected oil 23. This makes the removal of oil from the skimmer much easier as will be discussed more particularly hereinafter. By comparison, the funnel disclosed in U.S. Pat. No. 3,653,510 does not have vents and allows air pockets to form in the rear of the funnel in the oil collection area.

The skimmer top 22 is provided with air or pneumatic and foam flotation 24 which keeps the top of the skimmer above water level and yet does not raise it above the oil level as above noted. The foam flotation provides permanent stiffness for the top part, while the pneumatic flotation provides adjustable stiffness, depending on skimming speed and wave condition. Inflatable flotation 25 is provided around the sides of the rear section of the skimmer. The bottom of the skimmer 26 as shown in FIG. 3 is spaced from the top of the skimmer by side walls 27 and ties 28 which prevent the top of the skimmer from billowing and further prevent an air interface between top 22 and collected oil 23. The skimmer has an open bottom 26a between the rear of the bottom 26 and the rear "curtain" section 30 to allow water to exit. Preferably, side walls 27 are parallel or almost parallel to each other in the forward part of the skimmer. Thus, tapering of the side walls toward each other is predominantly in the aft part of the skimmer. This permits the entry of incoming wave trains without reflections and resulting oil loss around the skimmer. Hence the skimmer is essentially like an open window to incoming oil and water. By comparison, the sharply tapered funnel shown in U.S. Pat. No. 3,653,510 focuses incoming wave trains in front of the skimmer, and deflects incoming oil around the sides of and then behind the skimmer.

Top 22 and bottom 26 articulate easily with large waves and swells and yet the water motion within the skimmer is relatively quiescent not only because the top 22 tends to dampen wave chop but also because bottom 26 supported by the top 22 through ties 28 intercepts wave particle motion and sharply reduces orbital water motion within the skimmer which normally would sweep oil down and out of the skimmer. The ties 28 and the flotation 24 add some stiffness to the skimmer which tends to baffle or dampen "chop", i.e., the high frequency components of waves, yet still allows the skimmer to "ride" with the major low-frequency components of the waves. Stiffness may be varied from forward to aft (preferably the forward section is more stiff) by varying air pressure in different parts of the flotation, i.e, less pressure in aft sections, and by providing more flexible ties in the aft part of the skimmer. By comparison, the funnel described in U.S. Pat. No. 3,653,510 has no ties and no stiffening flotation elements to dampen wave chop.

The skimmer is purposely designed with an upwardly extended lip 29 which prevents wave splashover, particularly in the case of extremely choppy water. The raised lip flexes, presenting little interference to incoming waves permitting the skimmer to behave essentially as an open window with the floats 20 being to either side of the window or mouth to control the mean water elevation of the mouth. The device of U.S. Pat. No. 3,653,510 on the other hand, has no raised flexible lip, and it employs stiff, discrete floats in the mouth of the skimmer, both of which cause wave/structure collisions resulting in the oil being entrained in the water, passing around the skimmer and then being lost.

Water and oil entering the skimmer as shown by arrows in FIG. 3 proceed to the rear section 30 which is concave facing toward the front of the skimmer and water exits at the bottom of the skimmer, the oil remaining at the top part of the skimmer with any debris which collects within the skimmer.

Figure 3A:
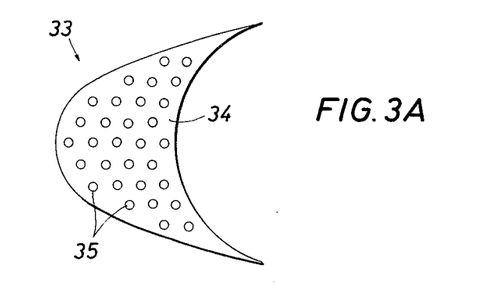
FIG. 3A is a top view of the apparatus which stabilizes the skimmer.

While the bottom-rear of the skimmer may be generally open as shown in FIG. 3, a more preferred arrangement is shown in FIG. 3A. A cresent-shaped piece 33 formed preferably of a double layered fabric 34 having crossing warp directions, is provided with holes 35 so that the crescent is about 25–75% closed. This functions to hold down and stabilize the rear of the skimmer, providing a more quiet collection region for the oil.

The rear of the skimmer may be raised periodically to allow debris which cannot be pumped to be exhausted. Alternatively, a large-mesh (1 inch to 12 inch) net may be provided at the mouth of the skimmer to prevent at least large debris from entering into the skimmer. The rather open net does not significantly hinder the entry of oil and water into the skimmer.

An air interface is not allowed between the top of the skimmer and the oil. The oil is selectively withdrawn from the skimmer by well point suction, preferably through a number of smaller oil recovery suction points 31 rather than through a single large suction point. Undesirably, more water and less oil is withdrawn through a single large suction device, particularly one which is not integral well point suction but which floats on the oil sump and, in the case of prior art skimmers, moves up and down with wave motion, alternately pulling air above the oil sump and then water below the oil sump. Well point suction provides a smooth surface about the mouth of the withdrawal lines 31 so that there is no disturbance to the flow of oil into the lines. By comparison, the skimmer of U.S. Pat. No. 3,715,034 employs a baffle plate 26 which disrupts flow into line 24 due to wave oscillations.

Figure 4:
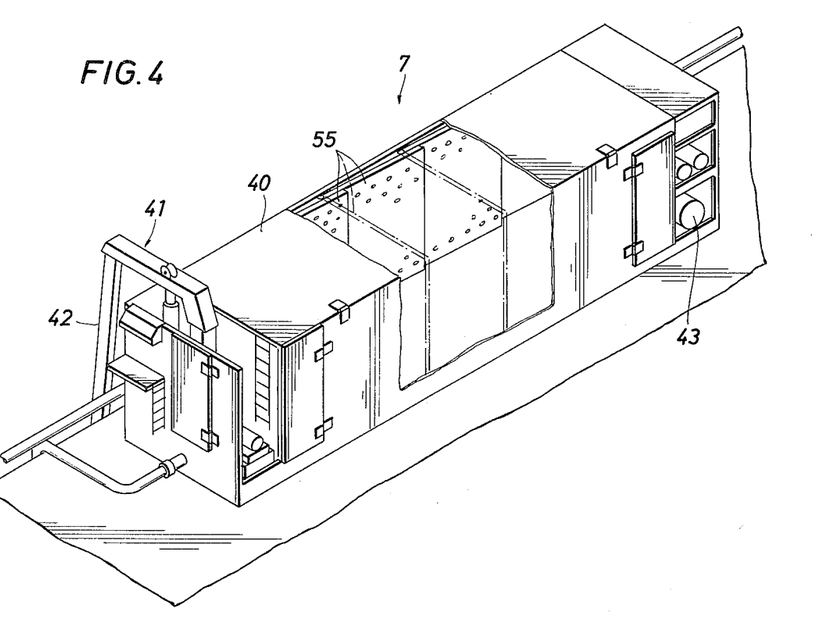
FIG. 4 is a view of a hydraulic crane, and power package with a container.

Referring now to FIG. 4 of the invention, there is shown a more detailed disclosure of the container 7 shown in FIG. 1. Container 7 includes all the components necessary for use with the present invention. As already mentioned, it is practical to store the container on drilling platforms to be near potential spills. If an oil spill is reported to the platform, the device is quickly loaded on board a work boat. The components of the skimmer can be assembled on deck as the boat proceeds toward the spill and be ready for deployment upon arrival. After use, the device can be repaired, cleaned and re-packaged to wait for its next use. The kit includes a hinged cover 40 which opens to disclose the skimmer nestled within the container 7, hydraulic crane 41 which is used to deploy the skimmer from the container alongside a work boat or other vessel of convenience, crane controls 42 which are employed to direct the operation of deploying the skimmer, and a power package 43 which powers the hydraulic crane 41 and other devices necessary for operation of the skimmer.

Figure 5:
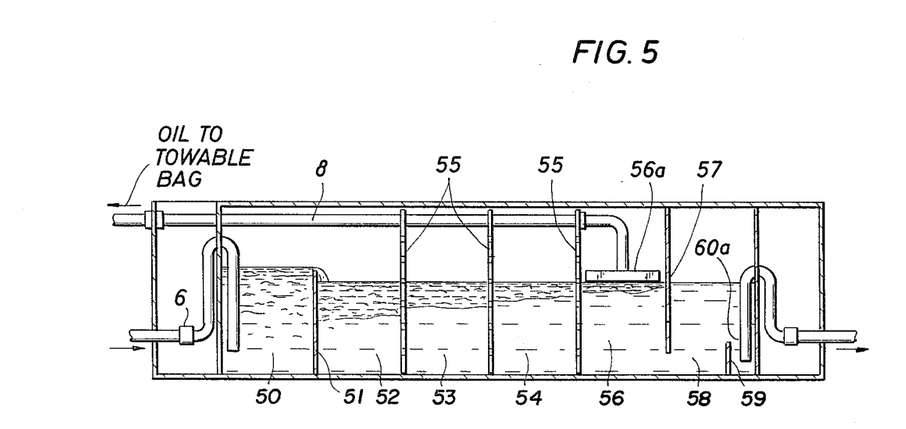
FIG. 5 is a view of the container being used for separating oil from water recovered by the skimmer of FIGS. 2 and 3.

FIG. 5 discloses the container of FIG. 4 in use for separating oil and water from the skimmer. An oil/water mixture comes from the skimmer via line 6 and proceeds into a first compartment 50 which is formed by one end of the container and a solid overflow baffle 51 and into one of several chambers 52 through 54 formed by perforated surge baffles 55. The oil and water flow through these chambers and into next-to-terminal chamber 56 formed by one of the perforated baffles 55 where oil is removed by floating suction head 56a and flowed via line 8 to a towable bag 9 as shown in FIG. 1. Water from the next-to-terminal chamber 55 passes beneath a solid underflow baffle 57 and into terminal chamber 58. A smaller baffle 59 is provided ahead of line 60a which removes clear water from chamber 58. The baffles, except for baffle 59, are all hinged so that they fold against the sides of the container when not in use and allow deployment of the skimmer and associated components within the container.

While the skimmer of the present invention is preferably employed alongside a movable vessel, it is apparent that is may also be used in a stationary position in streams or currents for oil collection purposes with or without a vessel. Also, it may be deployed between hulls of a catamaran vessel. Manifestly, the present invention is useful also for collecting floating debris and floating liquid pollutants other than oil. Where possible, multiple skimmers may be deployed on one or both sides of the vessel in use. The container is useful also with other water/oil separation techniques known in the art. Similarly, the wave damping part of the skimmer of this invention can be used separately to reduce wave turbulence in front of other types of skimmers.

For particularly viscous oils, an absorbent rope belt (U.S. Pat. No. 3,668,118) can be threaded into the sock and used in place of the integral well point suction components. Of course, even though the oil to be removed is amenable to well point suction, any endless loop sorbent can be used in place of well point suction (U.S. Pat. No. 3,700,593). For both viscous oils and debris, nets having a suitable fineness can be held in the water just behind the sock; the rear of the sock can be raised, allowing accumulated oil and debris to spill into the trailing net. If the net is hoisted from the water surface, water drains out and the remaining contaminant is deposited in the top of the container in a batch process.

Figure 6A:
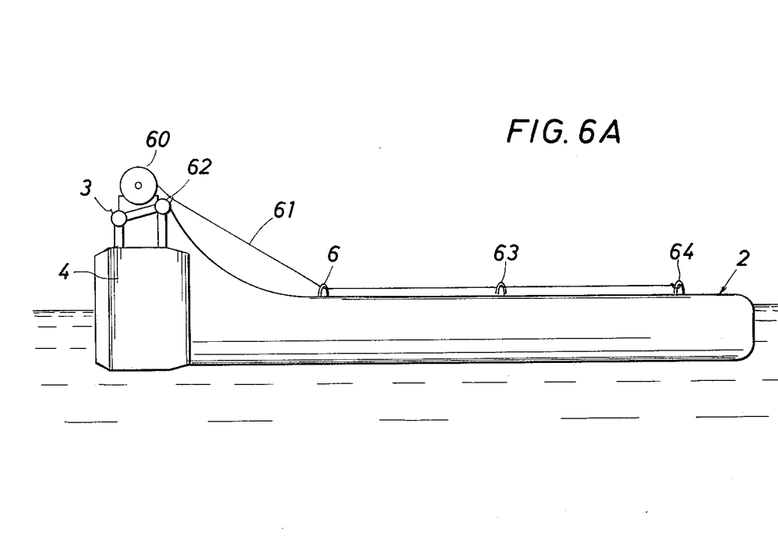
FIGS. 6A, 6B and 6C show a folding sequence for larger skimmers.
Figure 6B:
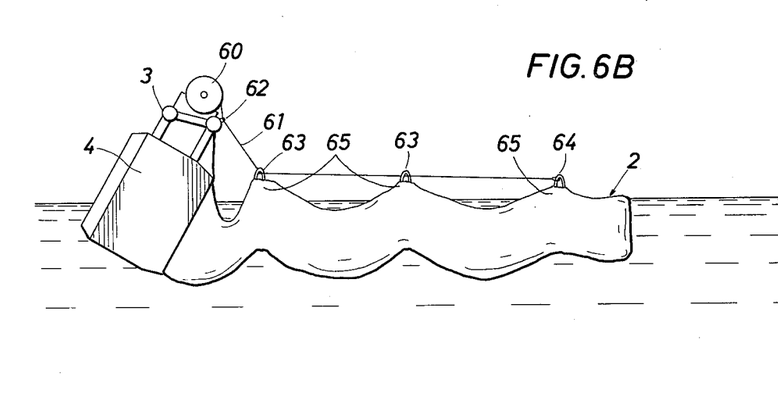
Figure 6C:
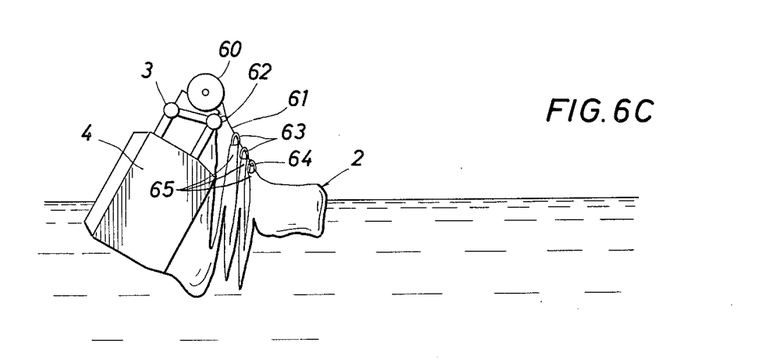

Folding of a large offshore-type skimmer is shown in FIGS. 6A, 6B and 6C. To recover the skimmer 2 after a skimming operation, a winch 60 mounted on the framework 3 (supported by floats 4) is used to pull in fold-up cables 61 ("cable" broadly is interpreted to include lines, ropes, belts, etc.). The cables 61 run from the winch 60 through D-rings or fairleads 62 on the framework 3, through two or more D-rings 63 on the fabric of skimmer 2, and are attached to D-rings 64 near the rear of the skimmer. Drawing up on the cables 61 pulls the rear forward while the intermediate D-rings 63 hold up the tops of the desired folds 65. In effect, the skimmer folds up "accordian-style". To deploy the skimmer, tension is released on the cables 61 and a slight forward motion of the tow vessel 1 straightens out the folds 65.

Figure 7A:
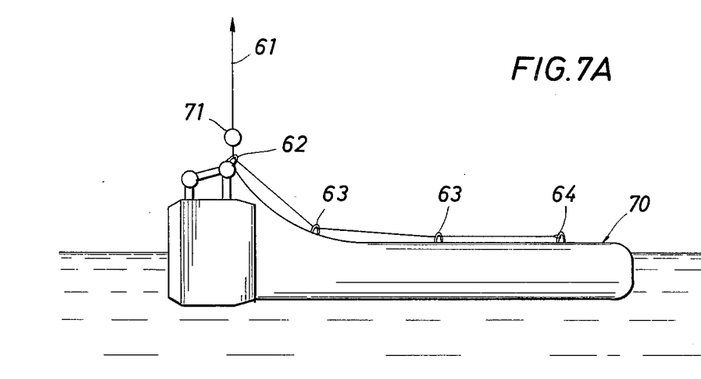
FIGS. 7A, 7B and 7C show a folding sequence for small skimmers.
Figure 7B:
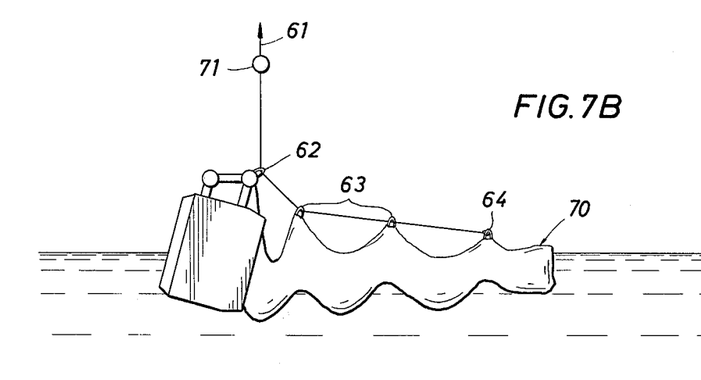
Figure 7C:
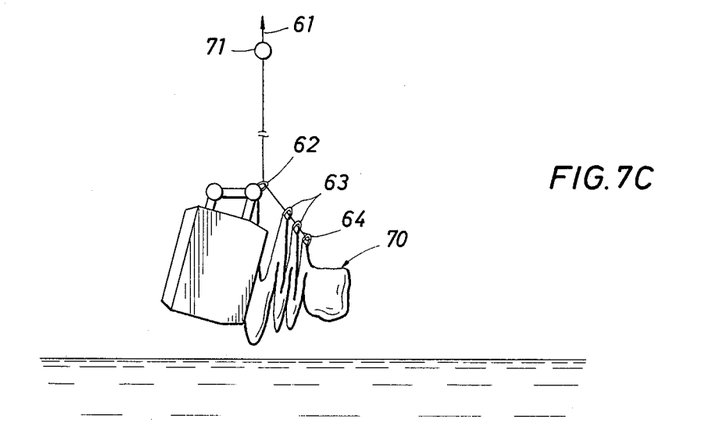

Folding of a smaller skimmer 70 is shown in FIGS. 7A, 7B and 7C. Cable 61 is pulled by a crane or davit (not shown). From a spreader bar 71, the cable is passed through D-rings 63 and affixed to the D-ring 64 closest to the end or rear of the skimmer. FIG. 7B shows the desired folds beginning to be formed with the skimmer in a partially folded disposition. FIG. 7C shows the skimmer lifted clear of the water by the crane or davit.

There are alternative ways of implementing this fold-up technique as shown in FIGS. 8-11. Cables can be located on the sides or bottom instead of the top, or the cables can be located in two or three places on the skimmer. One cable or multiple cables could be used. Grommets or fairleads or pulleys could be used in place of D-rings or triangular rings. The number of D-rings used depends on the allowable load on each and the number of folds desired. For example, three sets of rings may be used on a skimmer 42 feet long so that each fold is about 6 feet high and would not hang below framework floats of that height. A small triple-drum winch may be used to pull in the cables, or multiple single-drum winches may be used, or in smaller models the cables may be attached to a spreader bar or lift ring as shown. Lifting of the bar or ring with a crane or davit folds the fabric together and then lifts the entire assembly out of the water.

Figure 8:
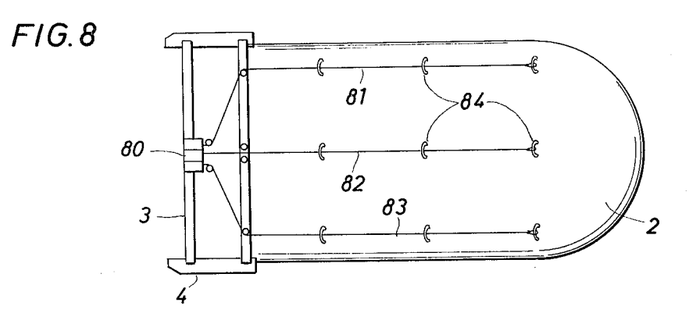
FIGS. 8 and 9 are plan views of alternate cable layouts.
Figure 9:
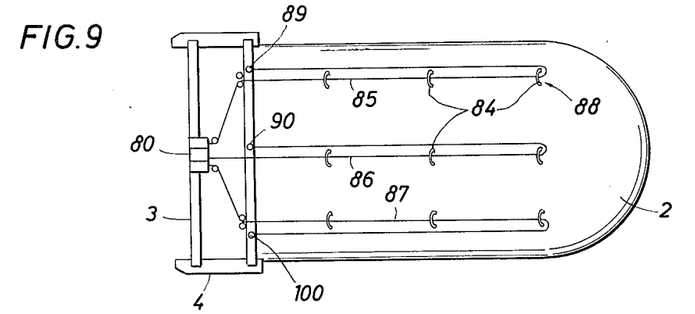
Figure 10:
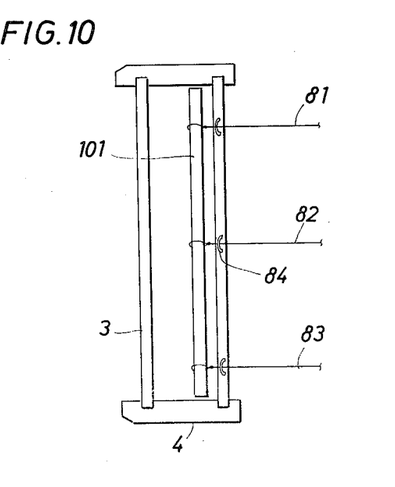
FIGS. 10 and 11 are frame plan views depicting respectively, cables attached to spreader and cables attached to lift ring.
Figure 11:
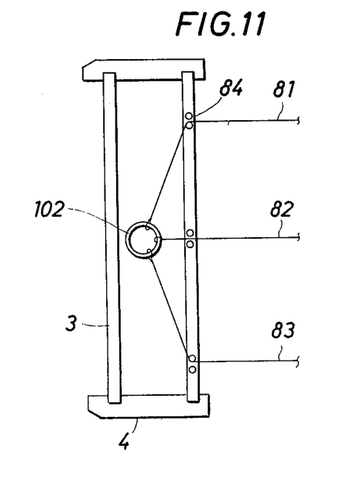

In FIG. 8 a triple-drum winch 80 is used to pull cables 81, 82 and 83 through multiple D-rings 84. The drums of the winch are preferably of equal diameter. The cables are attached to the terminal D-rings. As shown in FIG. 9, cables 85, 86 and 87 slide through the terminal rings 88, double back to frame 3 and are affixed thereto at points 89, 90 and 100, respectively. FIG. 10 shows a spreader bar 101 which may be employed to pull cables 81, 82 and 83 through D-rings or fairleads 84. Alternatively, as shown in FIG. 11, a lift ring may be substituted for spreader bar 101 (element 84 is shown as fairleads in FIG. 11 and as D-rings in FIG. 10).

Of course, the purpose and necessity for folding the skimmer (and this applies to other similar equipment) is to reduce the size of the load to be lifted onboard a support vessel. Folding in this manner makes a neat, compact, nearly rigid load which is much easier to handle and store than the fully deployed skimmer fabric.

Figure 12:
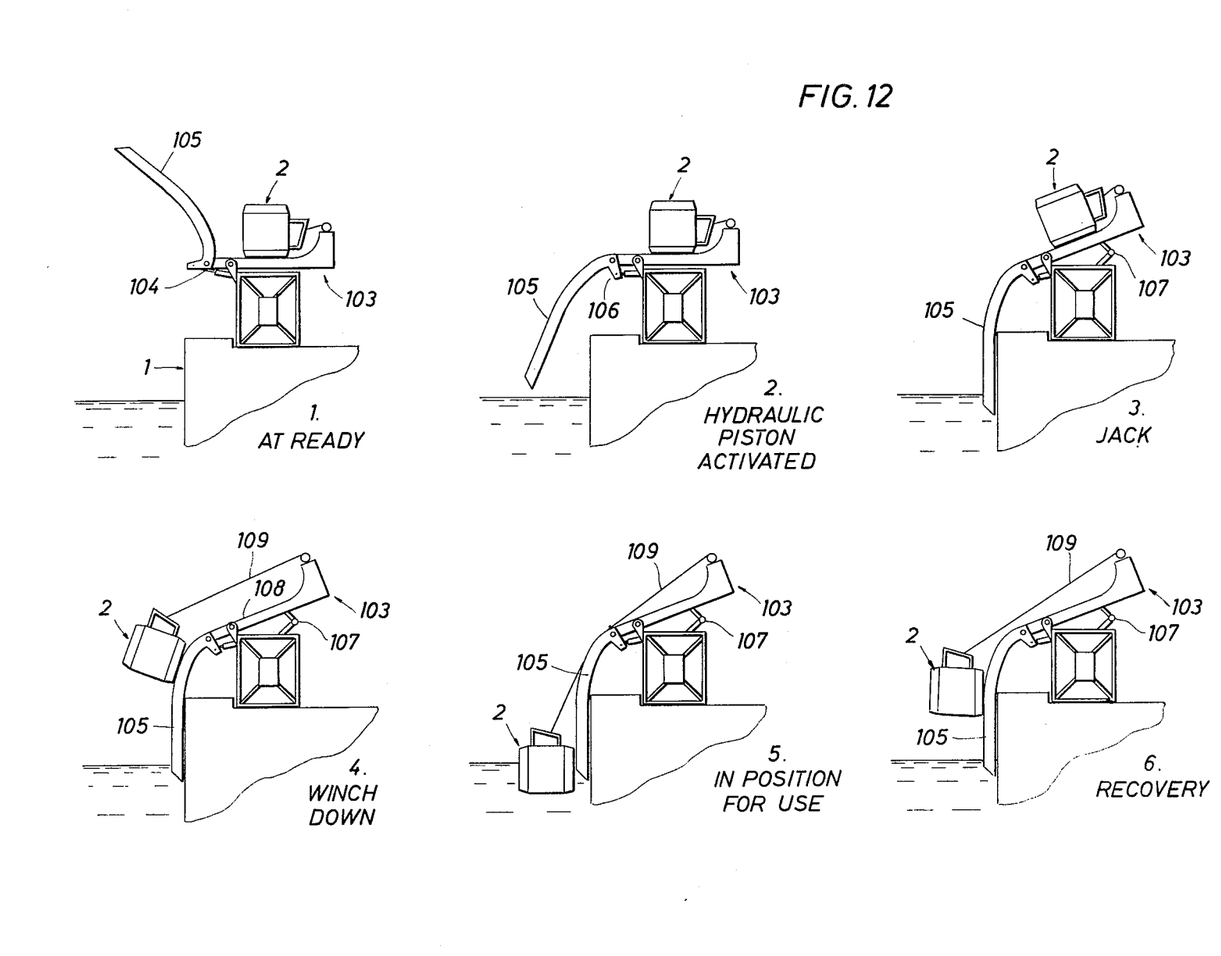
FIG. 12 schematically depicts a series of steps 1–6 for launching and retrieving the skimmer.

In FIG. 12 is shown a sequence of steps for launching and retrieving skimmer 2 with one or at least two inclinable ramps. Inclinable ramp 103 rests on top of skimmer container 7 and is formed of two segments connected by joint 104. Upwardly extending segment 105 helps secure the skimmer in place in the at ready position, step one. The second step for launching the skimmer is initiated by activating hydraulic piston 106 to lower segment 105 to a position such that it extends over the side of vessel 1. Next, step three, the entire ramp is inclined by means of jack 107, and the skimmer is allowed to slide toward the water off segment 108 and onto segment 105 which is now adjacent the side of the vessel. During the winching down operation of step four, the skimmer is held securely by a cable 109. In step five, the skimmer is in the water and ready to be turned 90° to assume a skimming position alongside the vessel. Recovery of the skimmer, as depicted by step 6 in FIG. 12, involves reversing the order of the preceding steps.

I claim as my invention:

1. Apparatus for removing oil from the surface of a body of water comprising, an at least partially flexible, elongated chamber having an open, at least partially submerged front for receiving the water and oil thereinto during relative movement between the chamber and the body of water; at least one inclinable ramp for launching and retrieving the chamber with a vessel; and at least one cable for unfolding the chamber laterally in the water, said cable being slidably connected to at least one extremity of the chamber and fixedly connected to the other extremity of the chamber.

2. The apparatus of claim 1 wherein said inclinable ramp comprises at least two segments united by a joint.

3. The apparatus of claim 2 wherein the chamber resides in a folded position on one segment of the ramp and the other segment of the ramp is in an elevated position.

4. The apparatus of claim 3 including means for lowering the elevated segments.

5. The apparatus of claim 4 including means for inclining the ramp and lowering the chamber into the water alongside the vessel.

6. The apparatus of claim 5 wherein the means for inclining the ramp is a jack.

7. The apparatus of claim 4 wherein the means for lowering the elevated segments is a hydraulic piston.

8. A method for launching, unfolding and towing a flexible, folded chamber, the chamber having a partially submergable, open, buoyant front for receiving water and oil thereinto during towing, comprising in combination the steps of, maintaining the folded chamber on an inclinable ramp onboard a vessel, inclining the ramp to slide the chamber into the water, aligning the chamber with the vessel to face the front of the chamber in the direction the vessel bow is pointed, securing the chamber alongside the vessel, towing the chamber with the vessel, and unfolding the chamber at the start of towing by releasing tension in cable means slidably connected to at least one extremity of the chamber and fixedly connected to the other extremity of the chamber.

9. The method of claim 8 wherein the chamber is retrieved after folding the chamber by tensioning the cable means.

* * * * *